United States Patent
Shiu

(10) Patent No.: US 9,740,631 B2
(45) Date of Patent: Aug. 22, 2017

(54) HARDWARE-ASSISTED MEMORY COMPRESSION MANAGEMENT USING PAGE FILTER AND SYSTEM MMU

(71) Applicant: GOOGLE INC., Mountain View, CA (US)

(72) Inventor: Shinye Shiu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 40 days.

(21) Appl. No.: 14/877,484

(22) Filed: Oct. 7, 2015

(65) Prior Publication Data

US 2016/0098356 A1 Apr. 7, 2016

Related U.S. Application Data

(60) Provisional application No. 62/060,949, filed on Oct. 7, 2014.

(51) Int. Cl.
*G06F 12/10* (2016.01)
*G06F 12/1009* (2016.01)
(Continued)

(52) U.S. Cl.
CPC .......... *G06F 12/1009* (2013.01); *G06F 3/061* (2013.01); *G06F 3/0604* (2013.01); *G06F 3/0638* (2013.01); *G06F 3/0653* (2013.01); *G06F 3/0656* (2013.01); *G06F 3/0673* (2013.01); *G06F 3/0683* (2013.01); *G06F 12/0891* (2013.01); *G06F 12/0897* (2013.01); *G06F 12/1027* (2013.01);
(Continued)

(58) Field of Classification Search
None
See application file for complete search history.

(56) References Cited

U.S. PATENT DOCUMENTS 5,544,349 A 8/1996 Berry et al.
5,699,539 A 12/1997 Garber et al.
(Continued)

OTHER PUBLICATIONS

International Search Report and Written Opinion for corresponding application No. PCT/US2015/054491 dated Dec. 4, 2015.
(Continued)

*Primary Examiner* — Kevin Verbrugge

(57) ABSTRACT

Provided are methods and systems for managing memory using a hardware-based page filter designed to distinguish between active and inactive pages ("hot" and "cold" pages, respectively) so that inactive pages can be compressed prior to the occurrence of a page fault. The methods and systems are designed to achieve, among other things, lower cost, longer battery life, and faster user response. Whereas existing approaches for memory management are based on pixel or frame buffer compression, the methods and systems provided focus on the CPU's program (e.g., generic data structure). Focusing on hardware-accelerated memory compression to offload CPU translates higher power efficiency (e.g., ASIC is approximately 100× lower power than CPU) and higher performance (e.g., ASIC is approximately 10× faster than CPU), and also allows for hardware-assisted memory management to offload OS/kernel, which significantly increases response time.

20 Claims, 7 Drawing Sheets

(51) Int. Cl.
   *G06F 3/06*      (2006.01)
   *G06F 12/0891*   (2016.01)
   *G06F 12/12*     (2016.01)
   *G06F 12/0897*   (2016.01)
   *G06F 12/1027*   (2016.01)
   *G06F 12/0802*   (2016.01)
   *G06F 12/0864*   (2016.01)
   *G06F 12/121*    (2016.01)

(52) U.S. Cl.
   CPC .......... *G06F 12/12* (2013.01); *G06F 12/0802* (2013.01); *G06F 12/0864* (2013.01); *G06F 12/121* (2013.01); *G06F 2212/1016* (2013.01); *G06F 2212/1044* (2013.01); *G06F 2212/401* (2013.01); *G06F 2212/502* (2013.01); *G06F 2212/601* (2013.01); *G06F 2212/604* (2013.01); *G06F 2212/65* (2013.01); *G06F 2212/68* (2013.01); *G06F 2212/683* (2013.01); *G06F 2212/69* (2013.01); *Y02B 60/1225* (2013.01)

(56) References Cited

U.S. PATENT DOCUMENTS

| | | | |
|---|---|---|---|
| 5,978,888 | A | 11/1999 | Arimilli et al. |
| 5,991,847 | A | 11/1999 | Ballard et al. |
| 6,434,669 | B1 | 8/2002 | Arimilli et al. |
| 6,532,520 | B1 | 3/2003 | Dean et al. |
| 6,556,952 | B1 | 4/2003 | Magro |
| 6,877,081 | B2 | 4/2005 | Herger et al. |
| 7,000,074 | B2 | 2/2006 | Wootton |
| 7,185,155 | B2 | 2/2007 | Sechrest et al. |
| 7,383,399 | B2 | 6/2008 | Vogt |
| 7,844,793 | B2 | 11/2010 | Herger et al. |
| 8,375,191 | B2 | 2/2013 | Kim |
| 8,458,404 | B1 | 6/2013 | Delgross et al. |
| 8,484,405 | B2 | 7/2013 | Mashtizadeh et al. |
| 8,516,005 | B2 | 8/2013 | Ergan et al. |
| 9,311,250 | B2 | 4/2016 | Van De Ven et al. |
| 2002/0073298 | A1 | 6/2002 | Geiger et al. |
| 2002/0147893 | A1 | 10/2002 | Roy et al. |
| 2002/0184579 | A1* | 12/2002 | Alvarez, II ........... G06F 9/4411 714/719 |
| 2003/0061457 | A1* | 3/2003 | Geiger ................ G06F 12/08 711/165 |
| 2003/0221072 | A1 | 11/2003 | Azevedo et al. |
| 2006/0136671 | A1 | 6/2006 | Balakrishnan et al. |
| 2010/0281216 | A1 | 11/2010 | Patel et al. |
| 2011/0289277 | A1 | 11/2011 | Takada et al. |
| 2013/0073798 | A1* | 3/2013 | Kang ................. G06F 12/0246 711/103 |
| 2014/0075118 | A1 | 3/2014 | Biswas et al. |
| 2014/0075137 | A1* | 3/2014 | Shin ....................... G06F 12/08 711/159 |
| 2014/0089600 | A1 | 3/2014 | Biswas et al. |
| 2014/0201456 | A1 | 7/2014 | Gibson et al. |
| 2014/0281235 | A1 | 9/2014 | Liu |
| 2015/0178214 | A1 | 6/2015 | Alameldeen et al. |
| 2015/0186282 | A1 | 7/2015 | Rahme et al. |
| 2016/0098193 | A1 | 4/2016 | Shiu |
| 2016/0098353 | A1 | 4/2016 | Shiu |
| 2016/0291891 | A1 | 10/2016 | Cheriton |

OTHER PUBLICATIONS

International Search Report & Written Opinion, dated Dec. 18, 2015, in related application No. PCT/US2015/054496.
International Search Report & Written Opinion, dated Nov. 19, 2015, in related application No. PCT/US2015/054499.
Tian et al., "Last-Level Cache Deduplication," Supercomputing ACM, NY NY (Jun. 10, 2014), pp. 53-62.
"Non-Final Office Action", U.S. Appl. No. 14/877,523, Feb. 2, 2017, 6 pages.
"Non-Final Office Action", U.S. Appl. No. 14/877,629, Feb. 9, 2017, 8 pages.
"International Preliminary Report on Patentability", Application No. PCT/US2015/054499, dated Apr. 20, 2017, 10 pages.
"International Preliminary Report on Patentability", Application No. PCT/US2015/054496, dated Apr. 20, 2017, 7 pages.
"International Preliminary Report on Patentability", Application No. PCT/US2015/054491, dated Apr. 20, 2017, 8 pages.
"Notice of Allowance", U.S. Appl. No. 14/877,523, dated May 30, 2017, 4 pages.

* cited by examiner

HARDWARE-ASSISTED MEMORY COMPRESSION MANAGEMENT USING PAGE FILTER AND SYSTEM MMU

The present application claims priority to U.S. Provisional Patent Application Ser. No. 62/060,949, filed Oct. 7, 2014, the entire disclosure of which is hereby incorporated by reference.

BACKGROUND

Existing approaches for memory compression typically focus on pixel/reference frame memory compression, which is often to GPU (graphics processor unit), ISP (image signal processor), video, and/or display streams. While such techniques are able to achieve some bandwidth reduction, none are directed to or capable of memory footprint reduction.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for managing memory. More specifically, aspects of the present disclosure relate to a hardware-based page filter designed to distinguish between active and inactive pages, and compress the inactive pages before a page fault occurs.

One embodiment of the present disclosure relates to a method for memory compression management comprising: using a page filter to determine that a page in a virtual memory space is inactive; removing working memory address information for the inactive page from a page table of a corresponding operating system; determining a location in working memory to allocate compression information for the inactive page; allocating a compressed memory address for the inactive page; updating a translation lookaside buffer with the compressed memory address for the inactive page; and writing the compressed memory address to the compressed memory.

In another embodiment, the method for memory compression management further comprises removing a corresponding page table entry for the inactive page from the page table of the corresponding operating system.

In another embodiment, the method for memory compression management further comprises raising an interrupt for a memory management unit of the operating system to allocate an address in the compressed memory for the inactive page.

Another embodiment of the present disclosure relates to a system for memory compression management, the system comprising a least one processor and a non-transitory computer-readable medium coupled to the at least one processor having instructions stored thereon that, when executed by the at least one processor, causes the at least one processor to: use a hardware page filter to determine that a page in a virtual memory space is inactive; remove working memory address information for the inactive page from a corresponding page table; determine a location in working memory to allocate compression information for the inactive page; allocate a compressed memory address for the inactive page; update an associative cache with the compressed memory address for the inactive page; and write the compressed memory address for the inactive page to the compressed memory.

In another embodiment, the at least one processor in the system for memory compression management is further caused to remove, from the page table, a corresponding page table entry for the inactive page.

In yet another embodiment, the at least one processor in the system for memory compression management is further caused to update the associative cache with the compressed memory address for the inactive page using a memory management unit.

In still another embodiment, the at least one processor in the system for memory compression management is further caused to raise an interrupt for a memory management unit to allocate an address in the compressed memory for the inactive page.

Yet another embodiment of the present disclosure relates to a method for memory compression management comprising: using a hardware page filter to detect an inactive page in a virtual memory space; compressing the inactive page prior to a page fault; and providing the kernel of a corresponding operating system with information about the compressed inactive page.

In another embodiment, the method for memory compression management further comprises logging, in a page table of the operating system, a starting physical address of the compressed memory for each of the pages in the virtual memory space.

In yet another embodiment, the method for memory compression management further comprises logging, in the page table, compression information for each of the pages in the virtual memory space.

In still another embodiment, the method for memory compression management further comprises raising an interrupt to update a page table entry in the kernel with the information about the compressed inactive page.

In one or more other embodiments, the methods and systems described herein may optionally include one or more of the following additional features: the translation lookaside buffer (or associative cache) is updated with the compressed memory address for the inactive page by a memory management unit of the operating system; the translation lookaside buffer (or associative cache) is updated with the compressed memory address for the inactive page to maintain translation information between virtual, compressed, and working memories; the page filter determines that the page in the virtual memory space is inactive based on a reference count for the page falling below a threshold count; the page filter determines that the page in the virtual memory space is inactive based on a reference count for the page falling below a threshold count during a predetermined period of time; and/or the interrupt is raised in response to a capacity eviction or reference count saturation.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
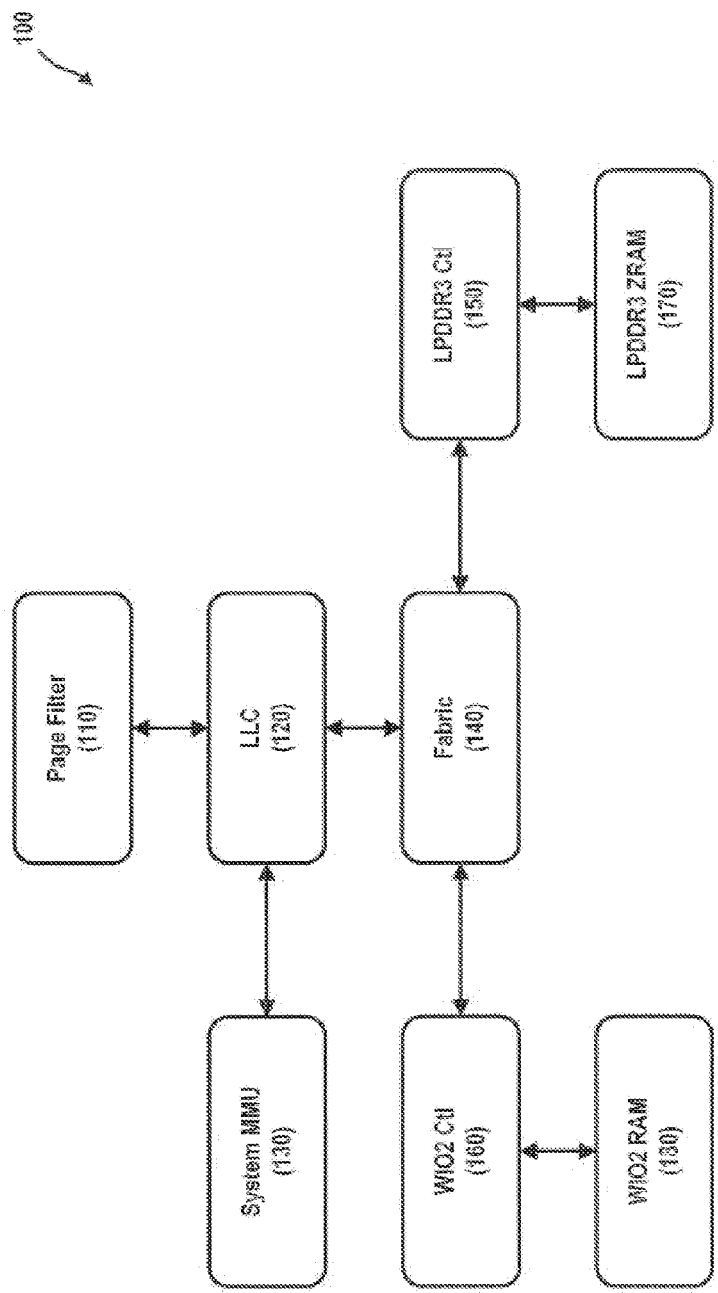
FIG. 1 is a block diagram illustrating an example system for hardware-assisted memory compression management using a page filter and system memory management unit according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

To implement virtual memory, a computer system needs to have special memory management hardware often known as a MMU (memory management unit). Without a MMU, when the CPU (computer processing unit) accesses RAM (random access memory), the actual locations within RAM never change (e.g., a particular memory address is always the same physical location within RAM). However, with a MMU memory addresses are processed through a translation step prior to each memory access. As such, a given memory address might be directed to a first physical address at one time, and a second physical address at another time. Because the resources required to individually track the virtual to physical translations for billions of bytes of memory would be too great, the MMU divides RAM into pages, which are contiguous sections of memory of a set size that the MMU handles as single entities. Correspondingly, physical memory can be viewed as an array of fixed-size slots called page frames, each of which can contain a single virtual memory page.

To record where each virtual page of the address space is placed in physical memory, the operating system keeps a per-process data structure known as a page table (PT). The primary role of the page table is to store address translations for each of the virtual pages of the address space, thereby informing where in physical memory each page resides. To translate a virtual address that a particular process generated, it is necessary to first split it into two components: the virtual page number (VPN), and the offset within the page.

With the VPN it is possible to then index the page table and determine which physical frame the virtual page resides within. For example, using the page table it is possible to determine the corresponding physical frame number (PFN) (also sometimes called the physical page number or PPN) for the virtual page. The virtual address can then be translated by replacing the VPN with the PFN (or PPN). It should be understood that the offset is not translated (it remains the same) because the offset simply indicates the desired byte within the page.

A page fault is the sequence of events that occurs when a program attempts to access (e.g., request) data (or code) that is in its address space, but is not currently located in the operating system's real memory (e.g., RAM). The operating system must handle a page fault by somehow making the accessed data memory resident, allowing the program to continue operating as though the page fault had never occurred. For example, if the CPU presents a desired address to the MMU, and the MMU has no translation for this address, the MMU interrupts the CPU and causes software (often known as a page fault handler) to be executed. The page fault handler then determines what must be done to resolve the page fault (e.g., fetch the data from a virtual memory space and load it into the RAM).

When a process (e.g., associated with a program) requests access to data in its memory, it is the responsibility of the operating system to map the virtual address provided by the process to the physical address of the actual memory where that data is stored. A page table is where the operating system stores its mappings of virtual addresses to physical addresses, with each mapping also known as a "page table entry" (PTE).

A translation lookaside buffer (TLB) is an associative cache of page table entries (PTEs), where each block is a single PTE. If an entry (corresponding to a virtual page) is not in the TLB, then a TLB "miss" occurs. If that entry is also not in the operating system's real memory (e.g., it has been "paged out"), then a page fault occurs as well. The TLB and page table together make up a translation unit that maps from virtual addresses to physical addresses.

Embodiments of the present disclosure relate to methods and systems for managing memory using a hardware-based page filter designed to distinguish between active and inactive pages (sometimes referred to herein as "hot" and "cold" pages, respectively) so that inactive pages are compressed prior to the occurrence of a page fault.

As will be described in greater detail below, the methods and systems of the present disclosure are designed to achieve, among other things, lower cost, longer battery life, and faster user response. For example, in accordance with at least one embodiment, lower cost is achieved in that a 4 GB DRAM (dynamic random access memory) is made to behave like a 8 GB DRAM, at least with respect to capacity. In this sense, the methods and systems of the present disclosure trade compression compute energy (e.g., a few pJ/Op) for DRAM cost (e.g., a few dollars per GB). In terms of extending battery life, less DRAM access (GB/s) means less power consumption (mW), and thus the methods and systems described herein may trade on-chip compression compute energy (e.g., a few pJ/Op) for off-chip memory reference energy (e.g., a few hundred pJ/B). In addition, faster user response is achieved through utilization of hardware-assisted MMU (e.g., µs), rather than OS/kernel (e.g., ms).

Whereas existing approaches for memory management are based on pixel or frame buffer compression, the methods and systems of the present disclosure focus on the CPU's program (e.g., generic data structure). For example, in accordance with one or more embodiments, the methods and systems described herein utilize ZRAM (which provides a form of virtual memory compression, as further described below), which targets the program's generic heap. Focusing on hardware-accelerated memory compression to offload CPU translates higher power efficiency (e.g., ASIC is approximately 100× lower power than CPU) and higher performance (e.g., ASIC is approximately 10× faster than CPU), and also allows for hardware-assisted memory management to offload OS/kernel, which significantly increases response time. Additional details about ZRAM and its utilization in accordance with the methods and systems of the present disclosure are provided below.

ZRAM provides a form of virtual memory compression, ZRAM compresses an actual block of RAM in order to make more RAM available to the operating system. The kernel (e.g., computer program for managing input/output requests from software applications by translating such requests into data processing instructions for the CPU) dynamically compresses a program's memory without program knowing ("transparent" memory compression). This compression is achieved through the program's virtual address space and demand paging. The kernel can unmap pages from a program's page table and compress them. When a compressed paged is accessed (e.g., requested by a program), the page fault handler reads the PTE to locate the page from the compression pool space, decompresses the page, and links the page back to program's page table.

FIG. 1 is an example system 100 for hard ware-assisted memory compression management. In accordance with one or more embodiments described herein, the system 100 may include page filter 110, system memory management unit (system MMU) 130, last level cache (LLC) 120, fabric 140, main uncompressed memory controller (Wide I/O 2 or WIO2 Ctl) 160, main uncompressed memory with Wide I/O 2 interface standard (WIO2 RAM) 180, low-power double data rate memory controller (e.g., LPDDR3 Ctl) 150, and backup compressed memory (ZRAM) with LPDDR3 interface standard 170.

In accordance with at least one embodiment, page filter 110 may be configured to detect inactive (or "cold") pages, while System MMU 130 maintains victim TLB (translation lookaside buffer). LLC 120 may be, for example, 8 MB on-chip static random access memory (SRAM) and fabric 140 is the on-chip interconnect that moves command/packets between various agents (e.g., components, elements, etc.) of the system, including, for example, CPU, GPU, on-chip SRAM cache, off-chip DRAM, etc. Also, LPDDR3 Ctl 150 is a memory controller that interfaces with JEDEC LPDDR3 ZRAM 170 (the backup compressed memory). While LPDDR3 ZRAM 170 is provided for capacity reasons, the main working memory, WIO2 RAM 180, is included in the system 100 to provide working bandwidth. WIO2 RAM 180 is a specialized (e.g., high bandwidth, smaller capacity) memory that is provided in addition to on-chip MMU. It should be appreciated that while WIO2 is an industry standard, using both WIO2 and on-chip MMU together with LPDDR3 is a new approach that achieves improved speed and improved memory management.

In the sections that follow, "capacity eviction" and "reference count saturation" are used in the context of describing various features of the page filter (e.g., page filter 110 in the example system 100 shown in FIG. 1), in accordance with one or more embodiments of the present disclosure. For example, the page filter may have 1024 entries that keep track of active 4 KB pages' activity at the system level (not CPU). In this context, the page filter is an on-chip cache as the main page table resides in the DRAM. A cache controller will evict an old entry when a new page must be monitored (an action known as "capacity eviction"). Similarly, when an entry's reference count reaches its maximum value (that is, "reference count saturation"), the cache controller will raise an interrupt to inform the kernel's MMU to update the main page table.

In accordance with one or more embodiments described herein, hardware-based page profiling may be used in which an interrupt is raised in order to update the kernel's PTE during capacity eviction or reference count saturation. For example, one history table may track 4 KB pages while another history table tracks larger (e.g., 4 MB) pages. Each page may have a Least Recently Used (LRU) history or a reference count to see how often a page is referenced over a period of time, where this period of time may be adjustable. A threshold can be defined and when capacity eviction is needed an interrupt is raised to evict/compress unused pages. As described above, capacity eviction is when a new page must be monitored and an old entry must be evicted from the history table.

The following describes various features and operations of the page filter within an example process of hardware-based page profiling in accordance with one or more embodiments of the present disclosure. In the following description, reference may sometimes be made to corresponding features and/or operations illustrated in FIG. 3.

Figure 3:
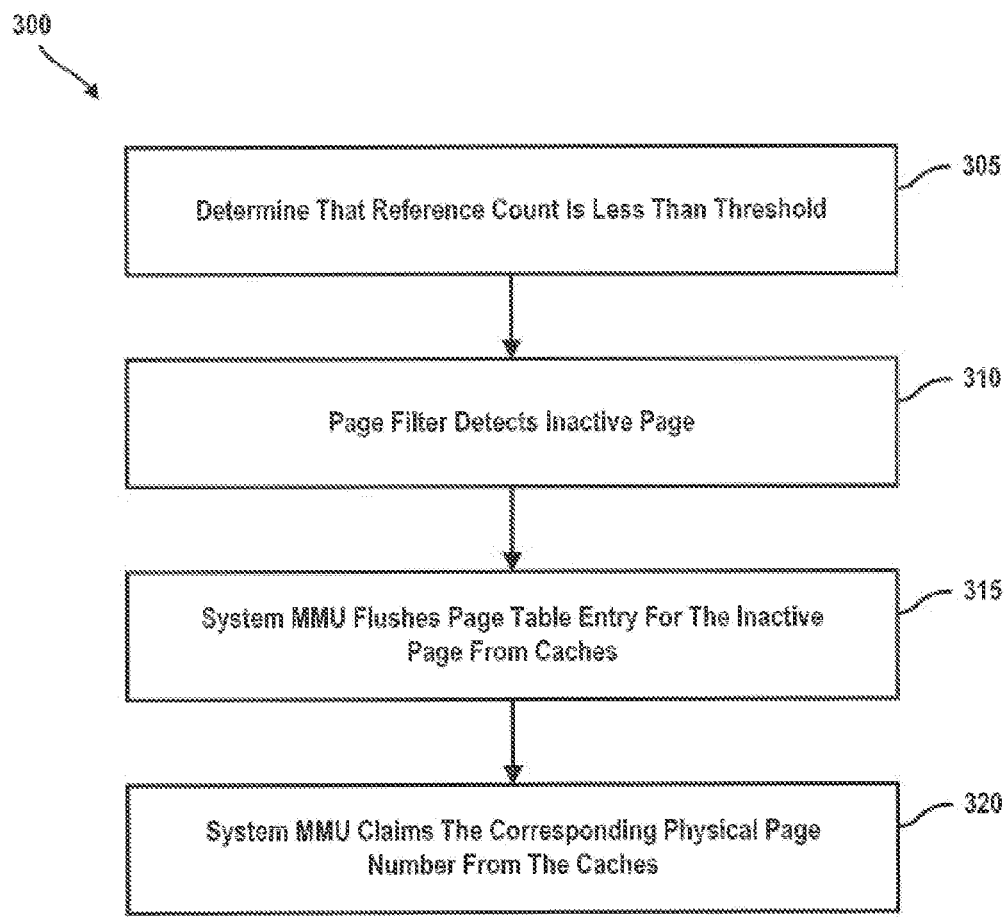
FIG. 3 is a flowchart illustrating an example method for hardware-based page profiling using a page filter according to one or more embodiments described herein.

FIG. 3 illustrates an example process 300 for hardware-based page profiling using a page filter. In accordance with one or more embodiments described herein, the example process for page profiling 300 may utilize a page filter (e.g., page filter 110 in the example system 100 shown in FIG. 1) designed to distinguish between active ("hot") and inactive ("cold") pages so that inactive pages are compressed before a page fault occurs. Further details about one or more of blocks 305-320 in the example process 300 for hardware-based page profiling are provided in the sections that follow.

PTE provides a history of page references so that the kernel can decide which page to compress. An active or "hot" page should not be compressed. The page filter is on-chip while the page table is in DRAM. Capacity eviction occurs in the page filter since the on-chip table has limited entries. Each time there is a capacity eviction, the page table entry in DRAM is updated with the latest reference count.

As described above, when reference count saturation occurs, the maximum reference count has been reached (e.g., 255 or more for 8-bit counter), which means that history can no longer be tracked. In such a case, the entry may be evicted, or the counter may be reset and the relevant reference count value is added to the page table entry in DRAM.

In accordance with at least one embodiment, the DRAM page table may be reset on either a predetermined, (e.g., every hour) basis or dynamically (e.g., according to a threshold being satisfied) so to prevent count saturation in DRAM.

In accordance with at least one embodiment, the page filter is designed to provide additional information to the kernel. Although the kernel already has some information, the page filter may add further information through, for example, reference count and/or LRU vector.

Additionally, in at least one embodiment, the operating system may provide a hint to the kernel that enables the kernel to override the hardware-based page filter. Such an arrangement could allow pages to be kept "hot" despite the pages not being used/referenced. Such a hint could also be used to override compression of pages that may take too long to decompress. Page sizes are determined by OS and then designed into the hardware. Another fixed parameter is the size of the history table on-chip. A microcontroller implementation, for example, could allow for these features to be configurable within resource limitations. The microcontroller could use ROM or external RAM to save its state.

Figure 4:
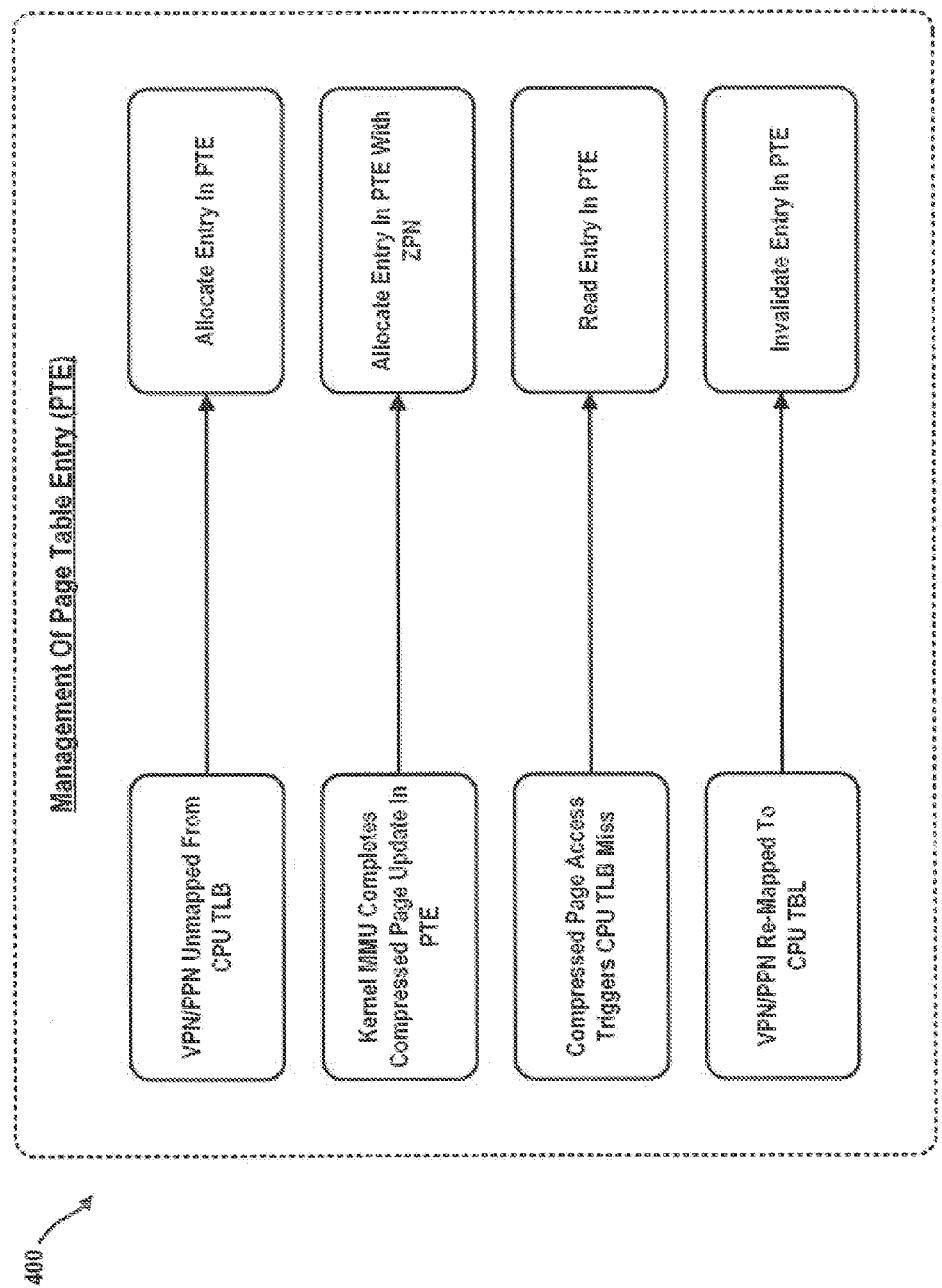
FIG. 4 is a block diagram illustrating example operations of a system memory management unit according to one or more embodiments described herein.

FIG. 4 illustrates example operations (400) of a system memory management unit (e.g., system MMU 130 in the example system 100 shown in FIG. 1 and described in detail above). In accordance with one or more embodiments of the present disclosure, the system MMU may be configured to perform hardware-assisted (e.g., hardware-accelerated) memory compression management by caching page table entries.

For example, in accordance with at least one embodiment, the hardware-assisted ZRAM may be responsible for caching virtual page numbers (VPN), physical page numbers (PPN), and compressed page numbers (ZPN). It should be understood in the contest of the present disclosure that main working memory (physical memory) can be uncompressed. For example, compressed memory space (e.g., 3 GB of LPDDR3) can become 6 GB to 9 GB of compressed ZRAM.

In existing approaches, the main working memory will try to map virtual addresses to physical addresses. However, with compression, more information is needed. As such, adding compression information means that a physical page from LPDDR3 space can be mapped to multiple compressed pages at, for example, 4 KB granularity. Thus, a 4 KB physical page can be mapped to two compressed pages.

Figure 2:
FIG. 2 is a block diagram illustrating an example main memory page table to which compression information has been added according to one or more embodiments described herein.

In accordance with one or more embodiments of the present disclosure, the compression information described above may be added to the page table. FIG. 2 illustrates an example of such a main memory page table to which compression information has been added. In addition, the start address of each page may also be logged in the page table, where the start address is the physical address of the compressed memory. It should be noted that logging the start address is in addition to mapping the virtual to physical addresses in the page table. In this manner, the virtual address is mapped to the physical address, and physical address is segregated into compressed and uncompressed memory.

As described above, the CPU has a TLB. An entry is allocated into system level MMU when an entry is unmapped, meaning that a page is picked out from working DRAM and removed from current mapping into compressed space. The kernel is then triggered to do some compression work, and the entry is allocated. When compression is complete, the allocated entry is then updated in the main memory table with information indicating a physical location into which the compressed page was allocated. The on-chip data structure (e.g., system MMU) then gets updated with the compressed page information.

An allocated entry may get read, for example, when a user attempts to swap between different tabs that the user has open in a web browser. In particular, the web page of the tab that the user is swapping to was compressed, and is now being decompressed as a result of the user swapping to that tab. In such a scenario, the compressed entry is read to determine where to fetch the compressed memory space and move it to uncompressed space.

As described above, a TLB miss results in a page fault. Therefore, in accordance with at least one embodiment of the present disclosure, some portion of the DRAM table may be saved in the on-chip MMU so that the entry can be obtained (e.g., retrieved, requested, etc.) faster than looking at the DRAM.

Furthermore, once the virtual page and physical page corresponding to an entry are re-mapped to CPU TLB (e.g., compressed page is moved from compressed region to uncompressed working memory), the entry can be removed from MMU because it is now allocated in CPU TLB. In another example, the page table entry can also be invalidated/removed by kernel MMU where, for example, the process is killed or the tab is removed. It should be understood that entries are not removed from virtual memory until a program is finished or killed, at which point the virtual address space may be cleared.

In accordance with at least one embodiment, a cache operation engine is configured to unmap physical pages from CPU TLB and to flush any lines from the last level cache (LLC). Flushing the lines from the LLC is necessary because hardware-triggered compression needs to remove compressed contents from cache in order to keep cache and memory consistent. The cache operation may, for example, occur simultaneously with allocation when something is pulled from DRAM and moved to compressed space. In another example, the cache operation may be triggered by hardware engine deciding that it is time to compress pages. In still a further example, the cache operation may be triggered by the kernel evicting pages from memory.

Figure 5:
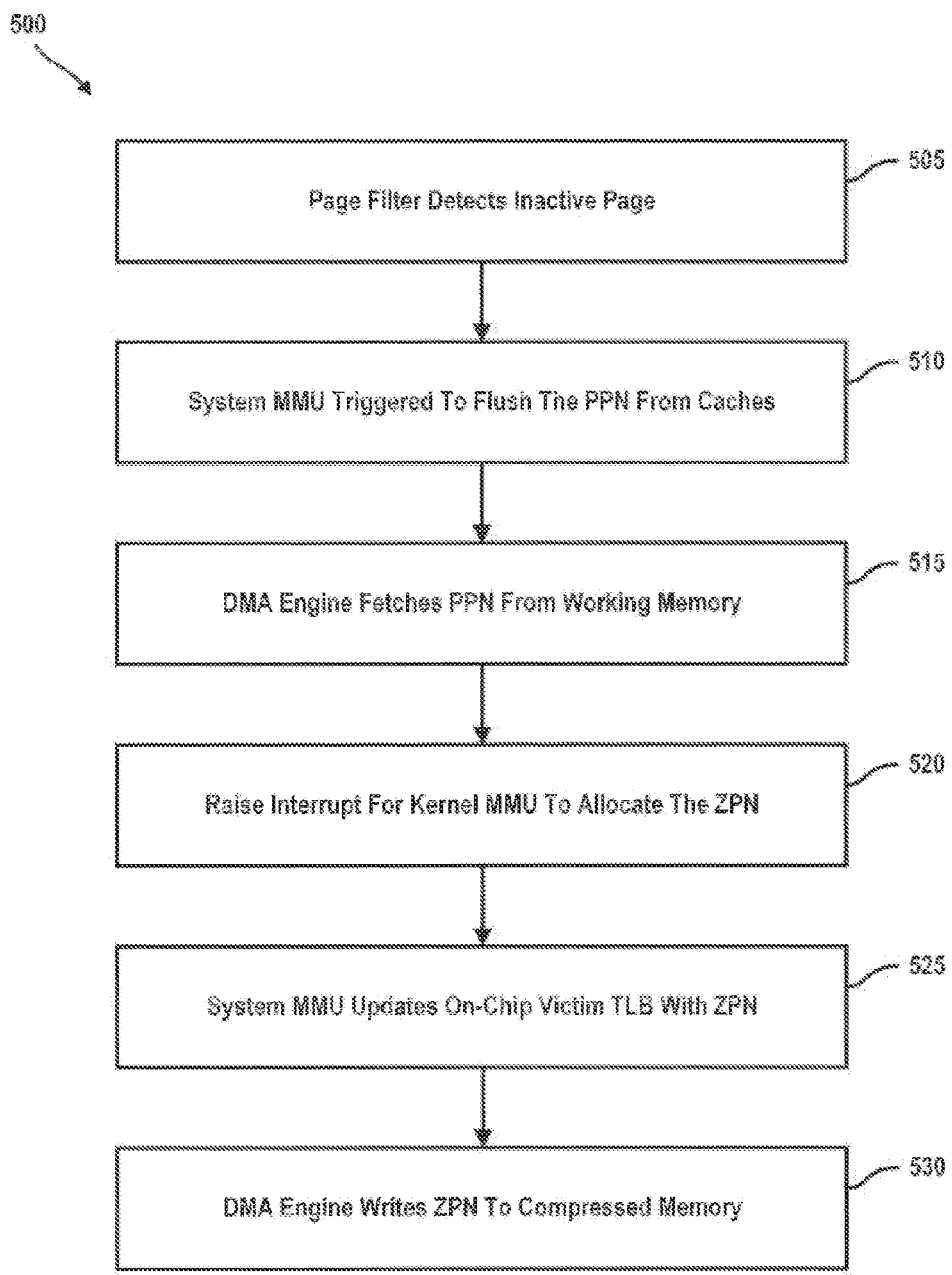
FIG. 5 is a flowchart illustrating an example method for compressing memory using a page filter and system memory management unit according to one or more embodiments described herein.

FIG. 5 illustrates an example process for compressing memory using a page filter and system memory management unit (e.g., page filter 110 and system MMU 130 in the example system 100 shown in FIG. 1 and described in detail above). Various details about one or more of blocks 505-530 in the example process 500 for memory compression using a page filter and system MMU are provided below.

In accordance with one or more embodiments described herein, when the reference count for a given page is determined to be less than a certain threshold (which may be predetermined or dynamically determined/adjusted during operations), the page is considered (e.g., categorized, deemed, determined, etc.) to be a cold page. The result of such an occurrence is that the system MMU flushes the corresponding page table entry from the caches or the kernel MMU handles a page fault (standard memory eviction).

If the on-chip page filter detects a cold page, the system MMU will claim that physical page number from the caches. For example, 4 KB data may be retched and compressed, and the compressed memory allocated to a page table entry. The kernel then looks up its memory page table and decides where to allocate the compressed page. Once the kernel decides which physical page gets the compressed page information, the on-chip MMU updates the victim TLB to keep translation between virtual, compressed, and working memories. So the compressed page is evicted out of working memory and into compressed memory. In accordance with one or more embodiments described herein, a direct memory access (DMA) engine may be configured to write the compressed page to the compressed memory (e.g., LPDDR3 ZRAM 170 in the example system 100 shown in FIG. 1). Address allocation occurs first followed by the content being saved to compressed memory.

Figure 6:
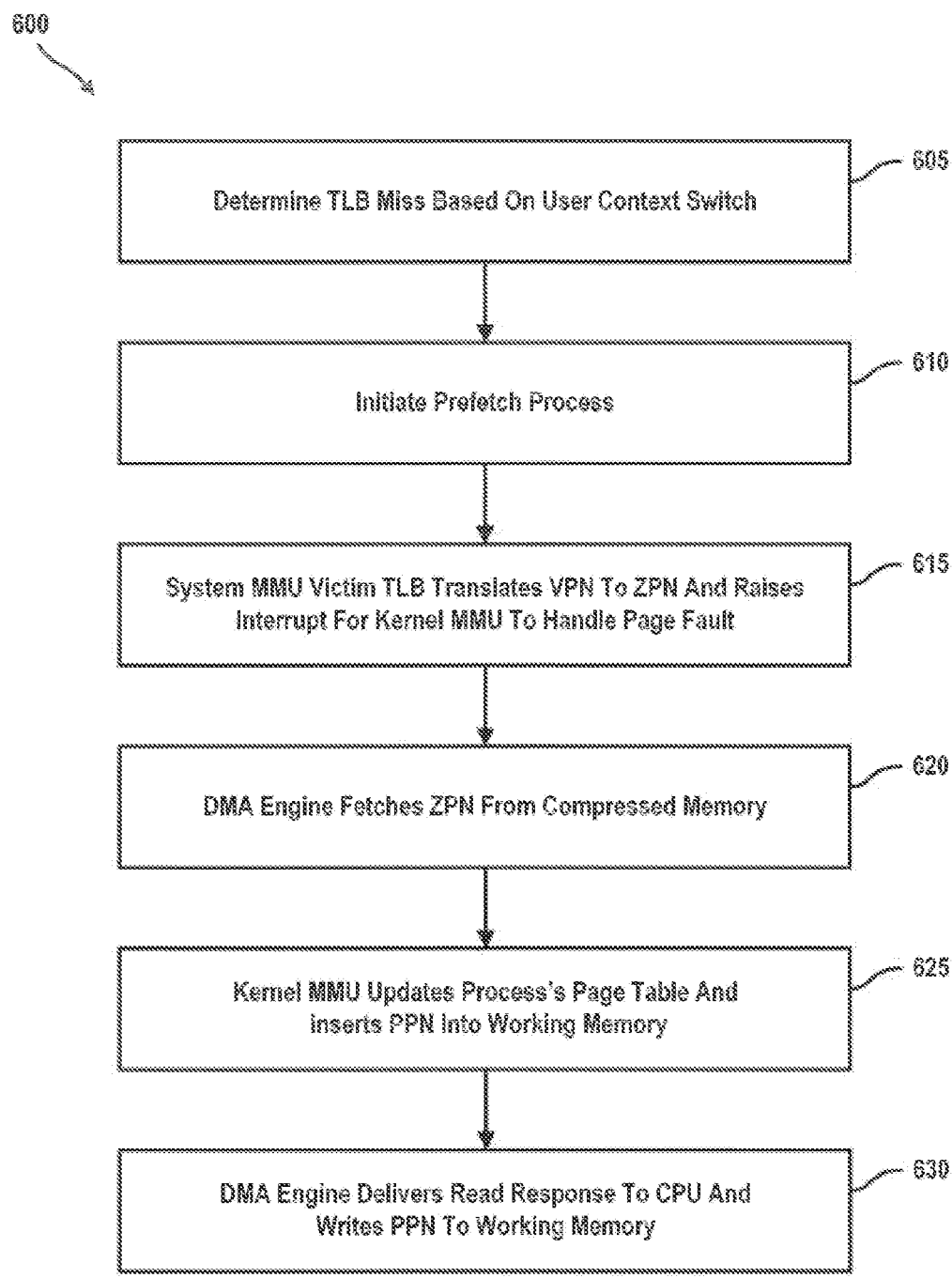
FIG. 6 is a flowchart illustrating an example method for decompressing memory using a system memory management unit according to one or more embodiments described herein.

FIG. 6 illustrates an example process for decompressing memory using a system memory management unit (e.g., system MMU 130 in the example system 100 shown in FIG. 1 and described in detail above). Various details about one or more of blocks 605-630 in the example process 600 for memory decompression using system MMU are provided below.

In accordance with one or more embodiments, a context switch may be, for example, when a user switches between tabs in a web browser. For example, the web page a user may attempt to switch to may be compressed already, and so the TLB will not have a physical address mapped in working memory, thereby causing a page fault. Such an occurrence may initiate (e.g., start) a prefetch process. For example, it may be assumed that a program has multiple pages that need to be fetched and filled. As such, the example process for memory decompression is designed to not only get (e.g., retrieve, request, fetch, etc.) the current requested page but also get follow-on contiguous requested pages.

Look up virtual and compressed addresses and raise interrupt to handle page fault by finding space to allocate the physical page number in working memory. While level 1 memory (which is main working memory) allocation is proceeding, the compressed page may be fetched from level 2 memory (which is compressed memory) and decompressed. MMU page table update and decompression should complete at about the same time (decompression may be faster). Level 1 memory may be allocated and updated in page table, and then uncompressed memory can be written to allocated Level 1 memory space.

Figure 7:
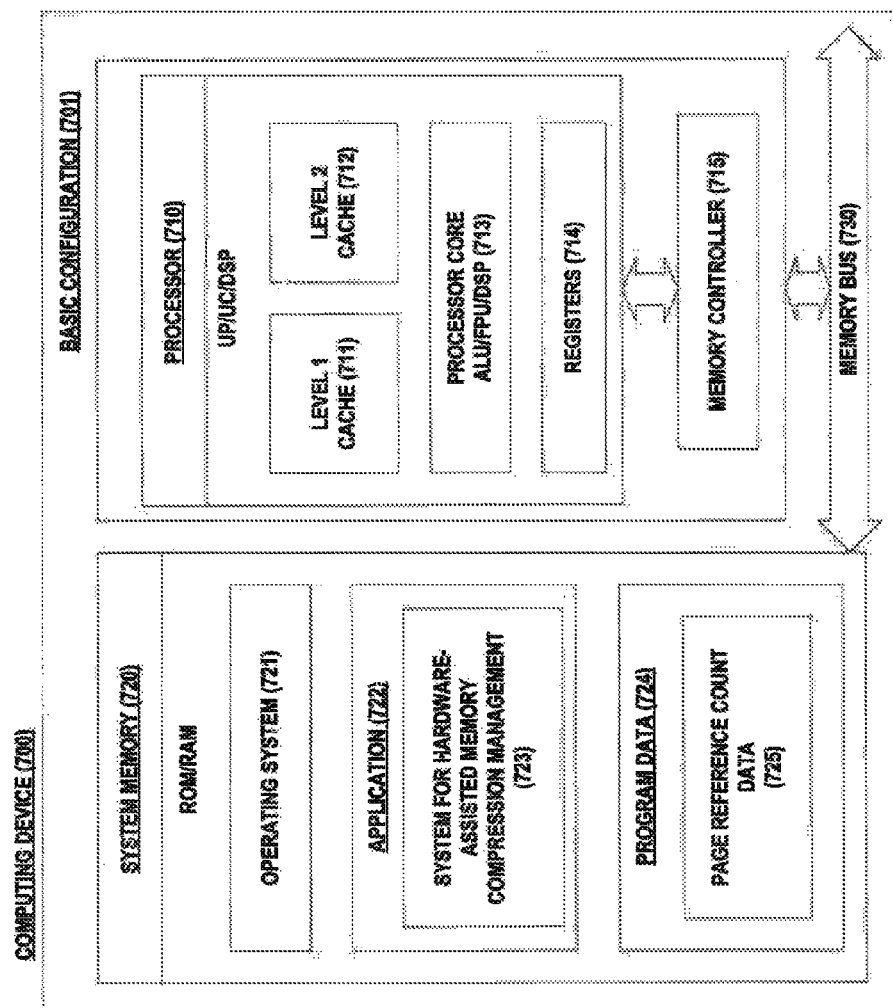
FIG. 7 is a block diagram illustrating an example computing device arranged for hardware-assisted memory compression management using a page filter and system memory management unit according to one or more embodiments described herein.

FIG. 7 is a high-level block diagram of an exemplary computer (700) that is arranged for hardware-assisted memory compression management using a page filter and system memory management unit. For example, in accordance with one or more embodiments described herein, the computer (700) may be configured to perform hardware-based page profiling in order to update the kernel's PTE during capacity eviction or reference count saturation. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a hardware-assisted memory compression management system (723) that uses a page filter and system MMU to efficiently compress and decompress memory.

Program Data (724) may include storing instructions that, when executed by the one or more processing devices, implement a system and method for hardware-assisted memory compression management. Additionally, in accordance with at least one embodiment, program data (724) may include page reference count data (725), which may relate to a page profiling operation in which a page is determined to be inactive when, for example, the page's reference count falls below a certain threshold. In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, DRAM, SRAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set form various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium, (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for memory compression management comprising:
   determining that a page in a working memory associated with a virtual memory space is inactive, the working memory a wide input/output random access memory;
   flushing a page table entry from a cache, the cache a static random access memory and the page table entry indicating the physical location of the inactive page in the working memory;
   determining a physical location in a compressed memory, the compressed memory a low-power double data rate random access memory, to write a compressed page, the compressed page compressed from the determined inactive page;
   and
   writing the compressed page to the determined physical location in the compressed memory.

2. The method of claim 1, wherein a translation lookaside buffer is updated with the determined physical location for the compressed page in order to maintain translation information between the working memory, the compressed memory, and the virtual memory space.

3. The method of claim 1, wherein a page filter determines that the page in the working memory is inactive based on a reference count for the page falling below a threshold count.

4. The method of claim 3, wherein the page filter is an on-chip cache.

5. The method of claim 1, wherein a page filter determines that the page in the working memory is inactive based on a reference count for the page falling below a threshold count during a predetermined period of time.

6. The method of claim 1, wherein a page filter determines that the page in the working memory is inactive and a kernel overrides the page filter, the override resulting in the page in the working memory remaining active.

7. The method of claim 1, wherein the static random access memory cache is on-chip.

8. The method of claim 1, further comprising allocating an address indicating the physical location of the compressed page in a main memory page table.

9. The method of claim 8, wherein the main memory page table resides in an off-chip dynamic random access memory.

10. A system for memory compression management comprising:
    at least one processor; and
    a non-transitory computer-readable medium coupled to the at least one processor having instructions stored thereon that, when executed by the at least one processor, causes the at least one processor to:
    use a page filter to determine that a page in a working memory associated with a virtual memory space is inactive, the working memory a wide input/output random access memory;
    use a memory management unit to flush a page table entry from a cache, the cache a static random access memory;
    use the memory management unit to determine a physical location in a compressed memory, the compressed memory a low-power double data rate random access memory;
    and
    use a direct memory access engine to write the compressed page to the determined physical location in the compressed memory.

11. The system of claim 10, wherein the at least one processor is further caused to:
    update a translation lookaside buffer with the determined physical location for the compressed page using a memory management unit.

12. The system of claim 11, wherein the translation lookaside buffer is updated with the determined physical location for the compressed page in order to maintain translation information between the working memory, the compressed memory, and the virtual memory space.

13. The system of claim 10, wherein the page filter determines that the page in the working memory is inactive based on a reference count for the page falling below a threshold count.

14. The system of claim 10, wherein the page filter determines that the page in the working memory is inactive based on a reference count for the page falling below a threshold count during a predetermined period of time.

15. A method for memory compression management, the method comprising:
    detecting an inactive page in a working memory associated with a virtual memory space, the working memory a wide input/output random access memory;
    compressing the inactive page prior to a page fault;
    providing a kernel of an operating system with information about the compressed inactive page;
    logging, in a main memory page table located within the working memory, a starting address indicating a physical location in a compressed memory for the compressed inactive page, the compressed memory a low-power double data rate random access memory; and
    writing, to the compressed memory, the compressed inactive page.

16. The method of claim 15, wherein a page filter detects the inactive page in the working memory based on a reference count for the page falling below a threshold count during a predetermined period of time.

17. The method of claim 15, where the main memory page table includes a physical page number or a compressed page number.

18. The method of claim 15, wherein the main memory page table is reset on a predetermined basis.

19. The method of claim 15, wherein the main memory page table is reset on a dynamic basis.

20. The method of claim 15, wherein the main memory page table is updated in response to an interrupt indicating a reference count saturation.

* * * * *